United States Patent
Park et al.

(10) Patent No.: US 9,153,381 B2
(45) Date of Patent: Oct. 6, 2015

(54) CHIP DEVICE AND METHOD FOR MANUFACTURING THE SAME

(71) Applicant: Samsung Electro-Mechanics Co., Ltd., Suwon (KR)

(72) Inventors: Jung Tae Park, Suwon (KR); Seung Heon Han, Suwon (KR); Young Jun Choi, Busan (KR); Ji Hee Moon, Busan (KR); Ki Won Kim, Busan (KR); Joon Hwan Kwag, Suwon (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 115 days.

(21) Appl. No.: 13/827,397

(22) Filed: Mar. 14, 2013

(65) Prior Publication Data

US 2014/0085770 A1    Mar. 27, 2014

(30) Foreign Application Priority Data

Sep. 27, 2012  (KR) .......... 10-2012-0107849

(51) Int. Cl.
*H01G 4/228* (2006.01)
*H01G 4/008* (2006.01)
*H01G 4/30* (2006.01)
*H01G 4/232* (2006.01)
*H01G 4/12* (2006.01)

(52) U.S. Cl.
CPC ............... *H01G 4/008* (2013.01); *H01G 4/232* (2013.01); *H01G 4/2325* (2013.01); *H01G 4/30* (2013.01); *H01G 4/12* (2013.01)

(58) Field of Classification Search
USPC ................ 361/306.3, 303–305, 301.2, 301.4, 361/306.1, 321.1, 321.2
See application file for complete search history.

(56) References Cited

U.S. PATENT DOCUMENTS

2013/0020913 A1 *  1/2013  Shirakawa et al. ............ 310/364

FOREIGN PATENT DOCUMENTS

| JP | 04006805 A | * | 1/1992 |
| JP | 8-69950 | | 3/1996 |
| JP | 2011-108875 | | 6/2011 |

* cited by examiner

*Primary Examiner* — Nguyen T Ha
(74) *Attorney, Agent, or Firm* — NSIP Law

(57) ABSTRACT

Disclosed herein is a chip device including: a multilayer body having a hexahedral shape; an external electrode covering both distal ends of the multilayer body; and a shape maintaining material contained in the external electrode to maintain a shape of the external electrode at the time of forming the external electrode.

16 Claims, 4 Drawing Sheets

CHIP DEVICE AND METHOD FOR MANUFACTURING THE SAME

CROSS REFERENCE(S) TO RELATED APPLICATIONS

This application claims the benefit under 35 U.S.C. Section 119 of Korean Patent Application Serial No. 10-2012-0107849, entitled "Chip Device and Method for Manufacturing the Same" filed on Sep. 27, 2012, which is hereby incorporated by reference in its entirety into this application.

BACKGROUND OF THE INVENTION

1. Technical Field

The present invention relates to a chip device and a method for manufacturing the same, and more particularly, to a chip device in which manufacturing efficiency of an external electrode is improved, and a method for manufacturing the same.

2. Description of the Related Art

Among chip components, a chip device such as a multilayer ceramic capacitor (MLCC) is configured to include a multilayer body having an internal electrode and an external electrode electrically connected to the internal electrode while covering both distal ends of the multilayer body. The multilayer body, which is a multilayer body of a plurality of sheets, has a generally hexahedral shape. The external electrode is manufactured by a process of dipping both distal ends of the multilayer body into a metal paste, performing surface plate tamping for raising a coverage of the metal paste, called bottom tamping, and then drying the metal plates.

However, in the case of forming the external electrode by the above-mentioned process, a phenomenon that the external electrode is not formed at a uniform thickness along a surface of the multilayer body occurs. More specifically, when the multilayer body is dipped into the metal paste, due to surface tension of the metal paste, a thickness of edge portions of the multilayer body becomes thin and a thickness of surfaces other than the edge portions becomes relatively thick. In this case, the external electrode is not formed at the edge portions of the multilayer body to cause a problem such as exposure of the multilayer body, or the like, which causes problems such as deterioration of reliability of the chip device, badness of an appearance of the chip device, and the like. Particularly, even though a metal paste film having a uniform thickness is formed through the surface plate tamping, the metal paste returns to its original shape in a process of drying the metal paste applied to the multilayer body, such that a phenomenon that the thickness of the edge portions of the multilayer body becomes relatively thin again occurs. The smaller the size of the chip device, the more intensified the he return phenomenon of the metal paste.

RELATED ART DOCUMENT

Patent Document (Patent Document 1) Japanese Patent Laid-Open Publication No. JP-2011-108875

SUMMARY OF THE INVENTION

An object of the present invention is to provide a chip device including an external electrode having a uniform thickness, and a method for manufacturing the same.

Another object of the present invention is to provide a chip device having improved manufacturing efficiency, and a method for manufacturing the same.

According to an exemplary embodiment of the present invention, there is provided a chip device including: a multilayer body having a hexahedral shape; an external electrode covering both distal ends of the multilayer body; and a shape maintaining material contained in the external electrode to maintain a shape of the external electrode at the time of forming the external electrode.

The shape maintaining material may be a polyethylene or polyvinylene material.

The shape maintaining material may be used as a release agent for easily separating the multilayer body from a surface plate at the time of forming the external electrode.

The hexahedron may include end surfaces, sides, and edges connecting the end surfaces and the sides to each other, and the external electrode may include a central portion covering the end surface and an edge portion covering the edge, wherein a thickness of the edge portion is a half or more of that of the central portion.

The central portion of the external electrode covering the end surface of the hexahedron may have a flat shape.

According to another exemplary embodiment of the present invention, there is provide a method for manufacturing a chip device, including: manufacturing a multilayer body having a hexahedral shape; applying a metal paste to both distal ends of the multilayer body; coating a shape maintaining material on the metal paste; firing the metal paste; and forming an external electrode by performing a plating process on the metal paste.

The coating of the shape maintaining material may include coating a surface of the metal paste with a polyethylene or polyvinylene based material.

The firing of the metal paste may include removing a portion of the shape maintaining material formed on the metal paste.

The method may further include, before the firing of the metal paste, separating the multilayer body from a surface plate using the shape maintaining material as a release agent.

The method may further include, before the firing of the metal paste, drying the metal paste on which the shape maintaining material is formed.

The drying of the metal paste may be performed in the state in which the multilayer body is closely adhered to a surface plate.

DESCRIPTION OF THE PREFERRED EMBODIMENTS

Figure 1:
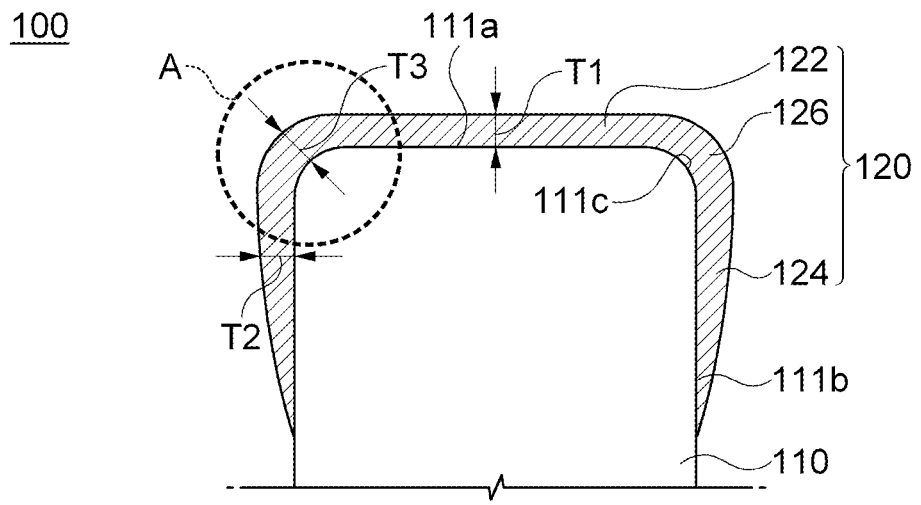
FIG. 1 is a view showing a chip device according to an exemplary embodiment of the present invention.

Various advantages and features of the present invention and methods accomplishing thereof will become apparent from the following description of embodiments with reference to the accompanying drawings. However, the present invention may be modified in many different forms and it should not be limited to exemplary embodiments set forth herein. Rather, these embodiments may be provided so that this disclosure will be thorough and complete, and will fully convey the scope of the invention to those skilled in the art. Like reference numerals throughout the specification denote like elements.

Terms used in the present specification are for explaining the embodiments rather than limiting the present invention. Unless explicitly described to the contrary, a singular form includes a plural form in the present specification. The word "comprise" and variations such as "comprises" or "comprising," will be understood to imply the inclusion of stated constituents, steps, operations and/or elements but not the exclusion of any other constituents, steps, operations and/or elements.

Further, the exemplary embodiments described in the specification will be described with reference to cross-sectional views and/or plan views that are ideal exemplification figures. In drawings, the thickness of layers and regions is exaggerated for efficient description of technical contents. Therefore, exemplified forms may be changed by manufacturing technologies and/or tolerance. Therefore, the exemplary embodiments of the present invention are not limited to specific forms but may include the change in forms generated according to the manufacturing processes For example, an etching region vertically shown may be rounded or may have a predetermined curvature.

Hereinafter, a chip device and a method for manufacturing the same according to exemplary embodiments of the present invention will be described in detail with reference to the accompanying drawings.

Figure 2:
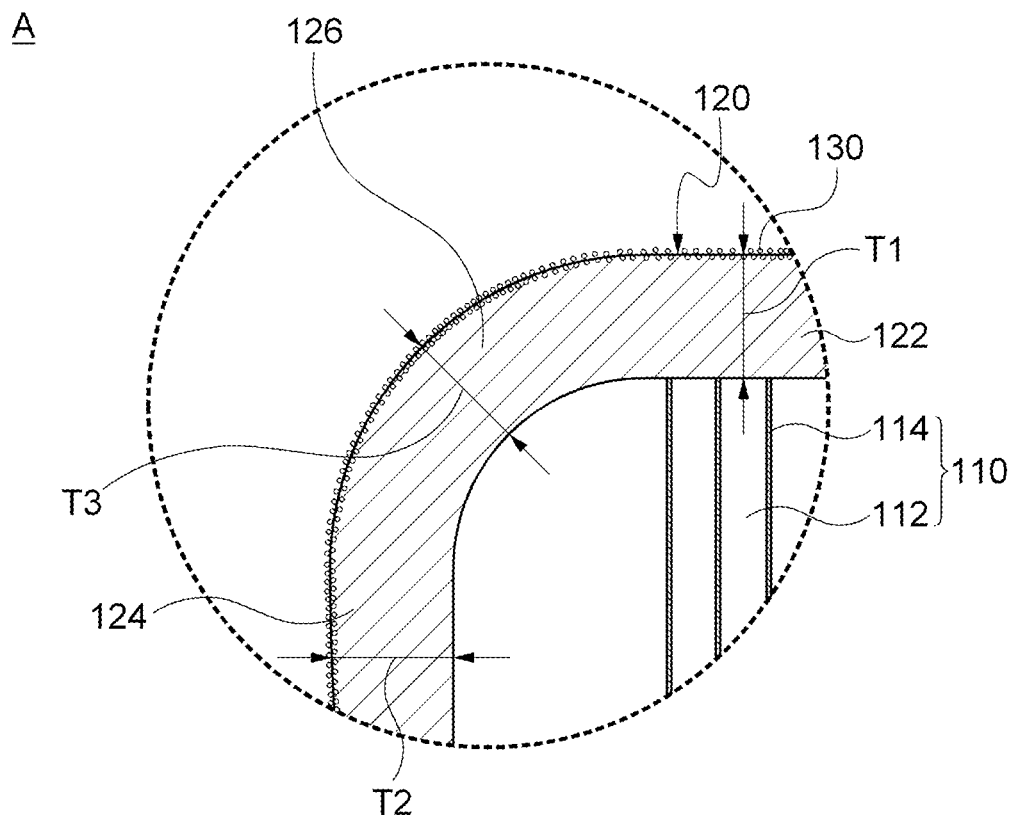
FIG. 2 is an enlarged view of the region A shown in FIG. 1.

FIG. 1 is a view showing a chip device according to an exemplary embodiment of the present invention; and FIG. 2 is an enlarged view of the region A shown in FIG. 1.

Referring to FIGS. 1 and 2, the chip device 100 according to the exemplary embodiment of the present invention may be any one of various kinds of active devices or passive devices. As an example, the chip device 100 may be a multilayer ceramic capacitor (MLCC).

The chip device 100 may include a multilayer body 110 and an external electrode 120. The multilayer body 110 may include ceramic sheets 112 and internal electrodes 114 formed in the ceramic sheets 112. The ceramic sheet 112 may be an insulating sheet called a green sheet. A plurality of ceramic sheets 112 may be vertically multi-layered to configure one hexahedron. The internal electrodes 114 may be formed by printing metal patterns on each of the ceramic sheets 112. The internal electrodes 114 formed in each of the ceramic sheets 112 may be electrically connected to each other to thereby be configured as a circuit pattern having a coil shape.

The external electrode 120 may be formed at both distal ends of the multilayer body 110. More specifically, since the multilayer body 110 has a hexahedral shape, it may have a total of six surfaces. The six surfaces may be configured of two end surfaces 111a, four sides 111b connecting the end surfaces 111a to each other, edges 111c connecting the end surfaces 111a and the sides 111b to each other, and the like. Here, the edge 111c may have a shape in which it is rounded at a predetermined curvature. The external electrode 120 may have a structure in which it covers portions of the sides 111b adjacent to the end surface 111a as well as the end surface 111a. Therefore, the external electrode 120 may have a structure in which it covers a region from both distal ends of the multilayer body 110 to portions of the sides 111b through the end surface 111a and the edge 111c.

The external electrode 120 may be formed at a generally constant thickness on a surface of the multilayer body 110. The external electrode 120 may be divided into a central portion 122 covering the end surface 111a of the multilayer body 110, an outside portion 124 covering the side 111b, and an edge portion 126 covering the edge 111c. The central portion 122 and the outside portion 124 may have a generally flat surface, and the edge portion 126 may have a curved surface rounded according to a curvature of the edge 111c. That is, the external electrode 200 may conformally cover the edges 111c adjacent to both distal ends of the multilayer body 110.

Meanwhile, it is preferable that a thickness T3 of the edge portion 126 is about a half or more of a thickness T1 of the central portion 122. In the case in which the thickness T3 of the edge portion 126 is less than a half of the thickness T1 of the central portion 122, the thickness T3 of the edge portion 126 becomes relatively thin, such that the edge 111c may be exposed to the outside or a plating solution used at the time of forming the external electrode 120 may penetrate into the multilayer body 110 through the edge portion 126. In addition, it is preferable that the thickness T3 of the edge portion 126 is less than about two times of a thickness T1 of the central portion 122. In the case in which the thickness T3 of the edge portion 126 exceeds two times of the thickness T1 of the outside portion 122, the thickness T1 of the central portion 122 becomes relatively thin, such that the central portion 122 may be exposed to the outside or the plating solution may penetrate into the multilayer body 110 through the central portion 122. In consideration of this point, it is more preferable that a ratio between the thickness T1 of the central portion 122 and the thickness T3 of the edge portion 126 is adjusted to be 1:0.7 to 1:1.3. Here, a thickness T2 of the outside portion 124 may be substantially similar to that of the edge portion 126 at a region adjacent to the edge 111c and become thinner toward a central portion of the side 111b.

In order to implement the external electrode 120 having the thickness ratio as described above, the external electrode 120 may be provided with a shape maintaining material 130. The shape maintaining material 130 may be provided in order to maintain a shape of a metal paste for forming the external electrode 120 until formation of the external electrode 120 is completed, in a process of forming the external electrode 120. The shape maintaining material 130 may be a predetermined insulating material. For example, the shape maintaining material 130 may be a poly based resin material. As an example of the shape maintaining material 130, an insulating material such as polyethylene or polyvinylene may be used. A detailed process in which the shape maintaining material 130 maintains the shape of the external electrode 120 will be described below.

The shape maintaining material 130 may be provided in various forms to the external electrode 120. As an example, the shape maintaining material 130 may be provided in a form in which it is contained in the external electrode 120. More specifically, after the shape maintaining material 130 serves to maintaining the shape of the metal paste applied to the multilayer body 110 in the process of forming the external electrode 120, most of the shape maintaining material 130 may be removed and only a portion thereof may remain in the external electrode 120, in a subsequent process of firing the metal paste. As another example, the shape maintaining material 130 may be provided in a thin coating form on a surface of the external electrode 120. More specifically, after the shape maintaining material 130 serves to maintaining the shape of the metal paste applied to the multilayer body 110 in the process of forming the external electrode 120, most of the shape maintaining material 130 may be removed in a subsequent process of firing the metal paste. However, a portion of the shape maintaining material 130 may remain on the surface of the external electrode 120 to serve to maintain the shape of the external electrode 120. Here, it is preferable that the shape maintaining material 130 remaining on the metal paste after the process of firing the metal paste is performed remains under a condition in which it does not hinder a plating process for forming the external electrode 120.

As described above, the chip device 100 according to the exemplary embodiment of the present invention includes the multilayer body 110 having the hexahedral shape and the external electrode 120 covering both distal ends of the multilayer body 110, wherein the external electrode 120 may be configured so that a ratio the central portion 122 covering the end surface 111a of the multilayer body 110 and the edge portion 126 covering the edge 111c of the multilayer body 110 is 1:0.5 or more. Further, the central portion 122 may be configured to have a flat surface. Therefore, the chip device according to the exemplary embodiment of the present invention includes the external electrode covering, at a uniform thickness, both distal ends of the multilayer body having the hexahedral shape, thereby making it possible to prevent badness of an appearance and improve reliability of the device.

In addition, the chip device 100 according to the exemplary embodiment of the present invention includes the shape maintaining material 130 maintaining the shape of the external electrode 120 as a preset shape in the process of forming the external electrode 120, thereby making it possible to allow the external electrode 120 covering the multilayer body 110 to have a uniform thickness. Therefore, in the chip device according to the exemplary embodiment of the present invention, a phenomenon that the thickness of the external electrode covering both distal ends of the multilayer body becomes relatively thinner at the edge portion than at the central portion of the end surface of the multilayer body is prevented, such that a phenomenon that the multilayer body is exposed to the edge portion or the plating solution penetrates into the multilayer body through the edge portion is prevented, thereby making it possible to prevent the badness of the appearance and improve the reliability of the device.

Hereinafter, a method for manufacturing a chip device according to the exemplary embodiment of the present invention will be described in detail. Herein, a description overlapped with that of the chip device 100 according to the exemplary embodiment of the present invention described above will be omitted or simplified.

Figure 3:
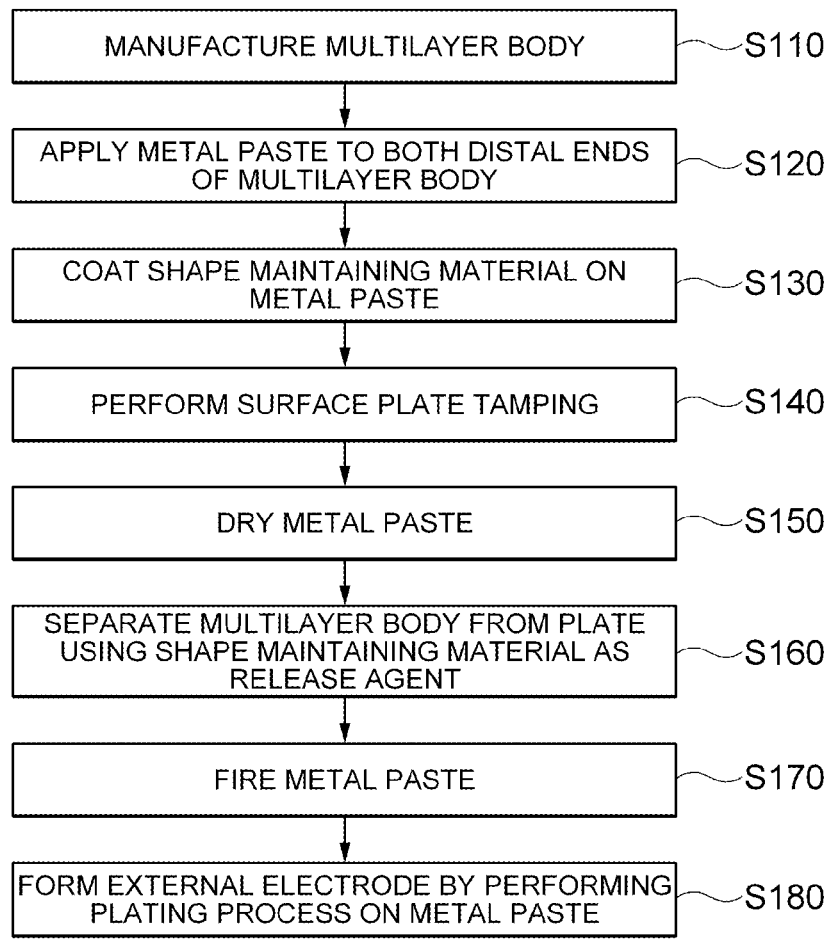
FIG. 3 is a flow chart showing a method for manufacturing a chip device according to the exemplary embodiment of the present invention.

FIG. 3 is a flow chart showing a method for manufacturing a chip device according to the exemplary embodiment of the present invention; and FIGS. 4 to 7 are views describing a process of manufacturing a chip device according to the exemplary embodiment of the present invention.

Figure 4:
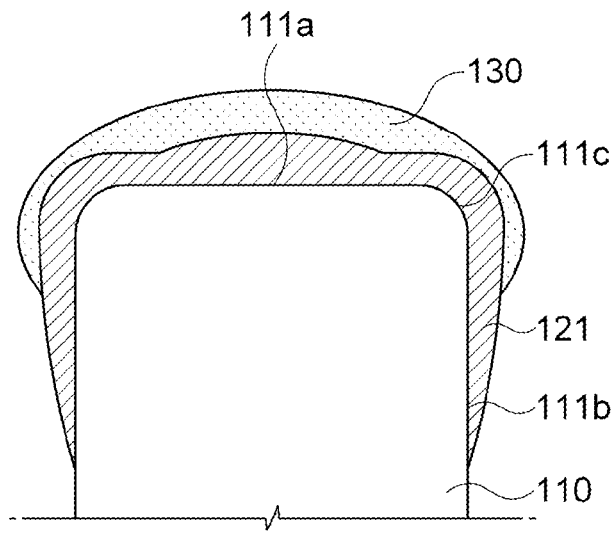
FIGS. 4 to 7 are views describing a process of manufacturing a chip device according to the exemplary embodiment of the present invention.

Referring to FIGS. 3 and 4, a multilayer body 110 may be manufactured (S110). The manufacturing of the multilayer body 110 may include preparing insulating sheets 112 (See FIG. 2), forming internal electrodes 114 (See FIG. 2) in each of the insulating sheets 112, multi-layering the insulating sheets 112, and firing the insulating sheets 112. Therefore, the multilayer body 110 having end surfaces 111a, sides 111b, and edges 111c connecting the end surfaces 111a and the sides 111b to each other and having a hexahedral shape may be manufactured.

A metal paste 121 may be applied to both distal ends of the multilayer body 110 (S120). The applying of the metal paste 121 may be executed by immersing the multilayer body 110 on a flat panel or a container to which a predetermined amount of metal paste is applied for a predetermined time. As the metal paste 121, a copper (Cu) paste may be used.

A shape maintaining material 130 may be coated on the metal paste 121 (S130). The coating the shape maintaining material 130 may be executed by a polyethylene or polyvinylene resin based insulating fluid onto the metal paste 121. The insulating fluid may be provided in a liquid phase to thereby be applied to the metal paste 121. Alternatively, the insulating fluid may be provided in a film form to thereby be attached to a surface of the metal paste 121. Therefore, the shape maintaining material 130 having a constant thickness may be formed on the surface of the metal paste 121.

Figure 5:
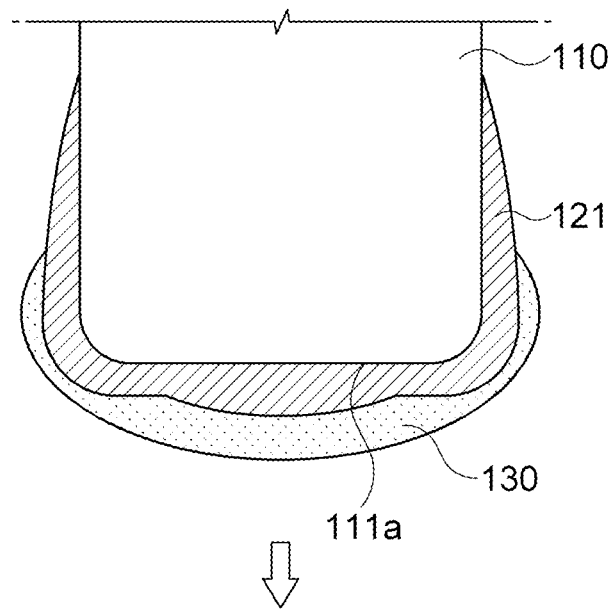
Figure 5:
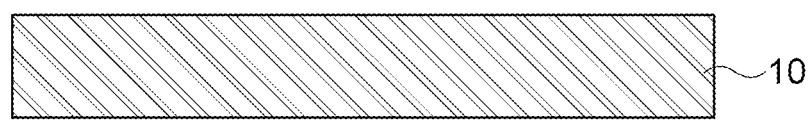

Referring FIGS. 3 and 5, a surface plate tamping process may be performed (S140). The performing of the surface plate tamping process may be executed by pressing the multilayer body 110 having the shape maintaining material 130 coated on the metal paste 121 on a plate 10. As the plate 10, a surface plate may be used. The surface plate tamping process may be executed at least one time. Therefore, the metal paste 121 may become flat at a central portion thereof covering the end surface 111a of the multilayer body 110.

Figure 6:
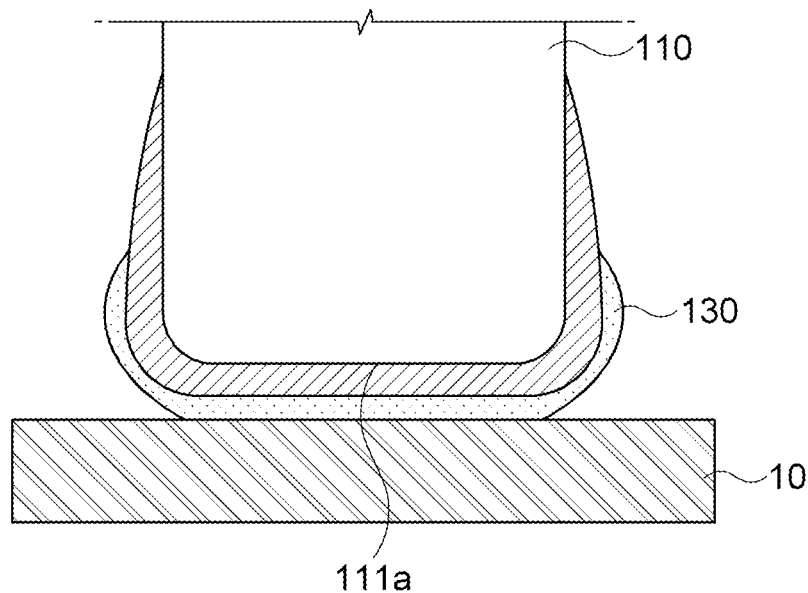

Referring to FIGS. 3 and 6, the metal paste 121 may be dried (S150). The drying of the metal paste 121 may be executed by heating the metal paste 121 in the state in which the multilayer body 110 is pressed on the plate 10. Therefore, the metal paste 121 formed on the end surface 111a of the multilayer body 110 may be maintained in a flat state, such that the metal paste 121 may be formed at both distal ends of the multilayer body 110. Here, the drying of the metal paste 121, which is to selectively perform heat treatment on the metal paste 121, may be executed under a condition in which the shape maintaining material 130 is not removed. Although the case in which the metal paste 121 is dried in the state in which the multilayer body 110 is pressed on the plate 10 has been described by way of example in the present embodiment, the drying of the metal paste 121 may also be executed in the state in which the multilayer body 110 and the plate 10 are separated from each other.

Figure 7:
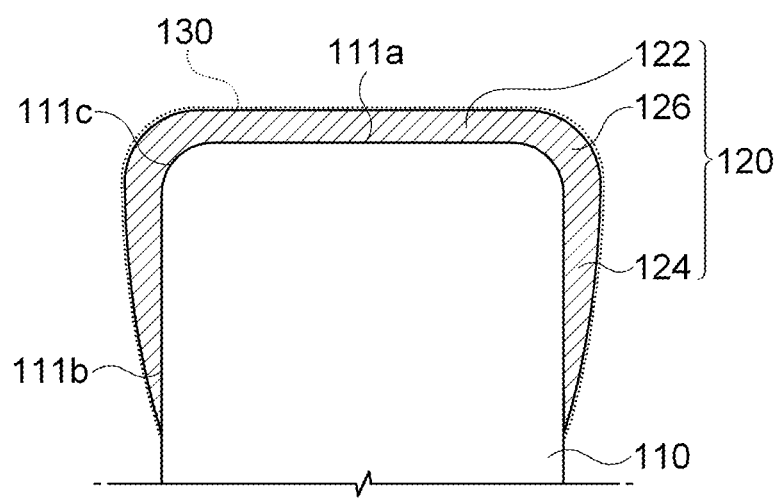

Referring to FIGS. 3 and 7, the multilayer body 110 may be separated from the plate 10 using the shape maintaining 130 (See FIG. 6) as a release agent (S160). Since the shape maintaining material 130 is a poly resin based insulating material, it may allow the metal paste 121 to be easily separated from the plate 10 in a process of separating the multilayer body 110 from the plate 10.

Furthermore, the shape maintaining material 130 may prevent the metal paste 121 from being deformed in the process of separating the multilayer body 110 from the plate 10. More specifically, the metal paste 121 may have a property that it is collected toward the center of the end surface 111a of the multilayer body 110 due to its surface tension in the process of separating the multilayer body 110 from the plate 10. Therefore, a phenomenon that a thickness of the central portion of the metal paste 121 covering the end surface 111a becomes thick and a thickness of the edge portion of the metal paste 121 covering the edge 111c of the multilayer body 110 becomes relatively thin may be generated. However, the shape maintaining material 130 covers the metal paste 121 to prevent a return phenomenon due to the surface tension as described above, thereby making is possible to prevent a phenomenon that the thickness of the metal paste 121 covering the multilayer body 110 becomes non-uniform.

As described above, the shape maintaining material 130 may perform a function of the release agent for separating the multilayer body 110 and the plate 10 from each other as well as a shape maintaining function of preventing the return phenomenon of the metal phases 121.

Referring to FIGS. 3 and 7, the metal paste 121 may be fired (S170). The firing of the metal paste 121 may include performing heat treatment on the metal paste 121, while removing a portion of the shape maintaining material 130. Here, most of the shape maintaining material 130 may be burned and removed by the firing process, and only a portion thereof may remain on the metal paste 121. The shape maintaining material 130 may remain in a coating form on the metal paste 121 or a form in which it is contained in the metal paste 121.

An external electrode 120 may be formed by performing a plating process on the metal paste 121 (S180). The forming of the external electrode 120 may be executed by performing an electroless or electro plating process using the metal paste 121 as a seed layer. Here, since the shape maintaining material 130 remains on the metal paste 121 under a condition in which it does not hinder the plating process, deterioration of plating efficiency due to the shape maintaining material 120 in the plating process may not be generated. Therefore, the external electrode 120 having a central portion 122 flatly covering the end surface 111a of the multilayer body 110, an outer side portion 124 covering the side 111b, and an edge portion 126 covering the edge 111c may be formed.

As described above, in the method for manufacturing a chip device according to the exemplary embodiment of the present invention, the external electrode 120 may be manufactured by performing the surface plate tamping process, the drying process, the firing process, the plating process, and the like, on the metal paste 121 in the state in which the metal paste 121 is applied onto the multilayer body 110 and the shape maintaining material 130 is coated on the metal paste 121. In this process, the shape maintaining material 130 may perform the shape maintaining function of preventing the external electrode 120 from being deformed. Therefore, in the method for manufacturing a chip device according to the exemplary embodiment of the present invention, the shape maintaining material is provided on the metal paste in the process of forming the external electrode to perform the function of maintaining the shape of the metal paste, thereby making it possible to manufacture the chip device including the external electrode formed at both distal ends of the multilayer body and having a uniform thickness.

In addition, in the method for manufacturing a chip device according to the exemplary embodiment of the present invention, the surface plate tamping process may be performed on the multilayer body 110 in the state in which the metal paste 121 is applied onto the multilayer body 110 and the shape maintaining material 130 is coated on the metal pate 121. Here, the shape maintaining material 130 may perform the function of the release agent allowing the multilayer body 110 from being easily separated from the surface plate. Therefore, in the method for manufacturing a chip device according to the exemplary embodiment of the present invention, a phenomenon that the thickness of the external electrode covering both distal ends of the multilayer body becomes relatively thinner at the edge portion than at the central portion of the end surface of the multilayer body is prevented, such that a phenomenon that the multilayer body is exposed through the edge portion or the plating solution penetrates into the multilayer body through the edge portion is prevented, thereby making it possible to manufacture the chip device having improved reliability.

The chip device according to the exemplary embodiment of the present invention includes the external electrode covering, at a uniform thickness, both distal ends of the multilayer body having the hexahedral shape, thereby making it possible to prevent badness of an appearance and improve reliability of the device.

In addition, in the chip device according to the exemplary embodiment of the present invention, a phenomenon that the thickness of the external electrode covering both distal ends of the multilayer body becomes relatively thinner at the edge portion than at the central portion of the end surface of the multilayer body is prevented, such that a phenomenon that the multilayer body is exposed to the edge portion or the plating solution penetrates into the multilayer body through the edge portion is prevented, thereby making it possible to prevent the badness of the appearance and improve the reliability of the device.

Further, in the method for manufacturing a chip device according to the exemplary embodiment of the present invention, the shape maintaining material is provided on the metal paste in the process of forming the external electrode to perform the function of maintaining the shape of the metal paste, thereby making it possible to manufacture the chip device including the external electrode formed at both distal ends of the multilayer body and having a uniform thickness.

Furthermore, in the method for manufacturing a chip device according to the exemplary embodiment of the present invention, a phenomenon that the thickness of the external electrode covering both distal ends of the multilayer body becomes relatively thinner at the edge portion than at the central portion of the end surface of the multilayer body is prevented, such that a phenomenon that the multilayer body is exposed through the edge portion or the plating solution penetrates into the multilayer body through the edge portion is prevented, thereby making it possible to manufacture the chip device having improved reliability.

The present invention has been described in connection with what is presently considered to be practical exemplary embodiments. In addition, the above-mentioned description discloses only the exemplary embodiments of the present invention. Therefore, it is to be appreciated that modifications and alterations may be made by those skilled in the art without departing from the scope of the present invention disclosed in the present specification and an equivalent thereof. The exemplary embodiments described above have been provided to explain the best state in carrying out the present invention. Therefore, they may be carried out in other states known to the field to which the present invention pertains in using other inventions such as the present invention and also be modified in various forms required in specific application fields and usages of the invention. Therefore, it is to be understood that the invention is not limited to the disclosed embodiments. It is to be understood that other embodiments are also included within the spirit and scope of the appended claims.

What is claimed is:

1. A chip device comprising:
   a multilayer body having a hexahedral shape;
   an external electrode covering both distal ends of the multilayer body; and
   a shape maintaining material contained in the external electrode to maintain a shape of the external electrode at the time of forming the external electrode.

2. The chip device according to claim 1, wherein the shape maintaining material is a polyethylene or polyvinylene material.

3. The chip device according to claim 1, wherein the shape maintaining material is used as a release agent for easily separating the multilayer body from a surface plate at the time of forming the external electrode.

4. The chip device according to claim 1, wherein the hexahedron includes end surfaces, sides, and edges connecting the end surfaces and the sides to each other, and
the external electrode includes a central portion covering the end surface and an edge portion covering the edge,
a thickness of the edge portion being a half or more of that of the central portion.

5. The chip device according to claim 1, wherein the central portion of the external electrode covering the end surface of the hexahedron has a flat shape.

6. A chip device comprising:
a multilayer body having a hexahedral shape;
an external electrode covering both distal ends of the multilayer body; and
a shape maintaining material formed on a surface of the external electrode to maintain a shape of the external electrode at the time of forming the external electrode.

7. The chip device according to claim 6, wherein the shape maintaining material is a polyethylene or polyvinylene material.

8. The chip device according to claim 6, wherein the shape maintaining material is used as a release agent for easily separating the multilayer body from a surface plate at the time of forming the external electrode.

9. The chip device according to claim 6, wherein the hexahedron includes end surfaces, sides, and edges connecting the end surfaces and the sides to each other, and
the external electrode includes a central portion covering the end surface and an edge portion covering the edge,
a thickness of the edge portion being a half or more of that of the central portion.

10. The chip device according to claim 6, wherein the central portion of the external electrode covering the end surface of the hexahedron has a flat shape.

11. A method for manufacturing a chip device, comprising:
manufacturing a multilayer body having a hexahedral shape;
applying a metal paste to both distal ends of the multilayer body;
coating a shape maintaining material on the metal paste;
firing the metal paste; and
forming an external electrode by performing a plating process on the metal paste.

12. The method according to claim 11, wherein the coating of the shape maintaining material includes coating a surface of the metal paste with a polyethylene or polyvinylene based material.

13. The method according to claim 11, wherein the firing of the metal paste includes removing a portion of the shape maintaining material formed on the metal paste.

14. The method according to claim 11, further comprising, before the firing of the metal paste, separating the multilayer body from a surface plate using the shape maintaining material as a release agent.

15. The method according to claim 11, further comprising, before the firing of the metal paste, drying the metal paste on which the shape maintaining material is formed.

16. The method according to claim 15, wherein the drying of the metal paste is performed in the state in which the multilayer body is closely adhered to a surface plate.

* * * * *